United States Patent

McWaid

Patent Number: 5,414,804
Date of Patent: May 9, 1995

[54] FAST IMAGE DECODER

[75] Inventor: Janet McWaid, Los Angeles, Calif.

[73] Assignee: Hughes Aircraft Company, Los Angeles, Calif.

[21] Appl. No.: 921,424

[22] Filed: Jul. 28, 1992

Related U.S. Application Data

[63] Continuation of Ser. No. 422,336, Oct. 16, 1989, abandoned.

[51] Int. Cl.⁶ .............................. G06F 15/00
[52] U.S. Cl. ............................... 395/133
[58] Field of Search ............. 382/43, 49, 54, 56, 382/45, 46; 340/747, 750; 395/129, 132, 133, 139; 345/133, 138

[56] References Cited

U.S. PATENT DOCUMENTS

| | | | |
|---|---|---|---|
| 4,364,024 | 12/1982 | Paetsch | 340/146.33 Y |
| 4,394,774 | 7/1983 | Widergreen et al. | 382/56 |
| 4,426,731 | 1/1984 | Edlund et al. | 382/56 |
| 4,509,194 | 4/1985 | Harrington | 382/56 |
| 4,843,632 | 6/1989 | Lee et al. | 382/56 |
| 4,926,266 | 5/1990 | Kurosawa | 358/426 |
| 4,928,243 | 5/1990 | Hodges et al. | 364/519 |
| 4,955,066 | 9/1990 | Notenboom | 382/56 |
| 4,962,542 | 10/1990 | Klees | 382/54 |
| 5,007,102 | 4/1991 | Haskell | 382/56 |
| 5,068,914 | 11/1991 | Klees | 382/54 |

FOREIGN PATENT DOCUMENTS 0357281 3/1990 European Pat. Off. .
60-191562 9/1985 Japan .

OTHER PUBLICATIONS

Drummond et al. "ACMP Data Compression" Final Report Oct. 1987, Hughes Aircraft, Support System.

*Primary Examiner*—Phu K. Nguyen
*Attorney, Agent, or Firm*—Georgann S. Grunebach; Terje Gudmestad; W. K. Denson-Low

[57] ABSTRACT

A fast image decoder 20 for decoding a compressed image encoded using the Poisson picture processing algorithm is disclosed. The invention includes a run length decoder 23 for run length decoding the compressed image, a processing circuit including a lookup table 24 for iteratively processing each pixel output by the run length decoder 23, a frame memory 26 for storing the reconstructed image and a feedback path 28 for providing image data from the frame memory 26 to the lookup table 24 for successive processing iterations. The reconstructed image from the frame memory 26 may be viewed on a display or further processed as required by the specific application.

28 Claims, 2 Drawing Sheets

FAST IMAGE DECODER

This is a continuation of application Ser. No. 07/422,336 filed Oct. 16, 1989, abandoned.

BACKGROUND OF THE INVENTION

1. Field of the Invention

The present invention relates to image processing. More specifically, the present invention relates to methods for decoding compressed image data.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Image data compression techniques encode image data and provide a compressed image which requires less memory for storage and has a lower transmission bandwidth than the original image. Thus, the compressed image can be transmitted or stored more easily. Generally, an image that has been compressed must be decoded to bring back the original image before the image is usable.

The most common method for encoding data for compression is transform coding. With this encoding method, the data is transformed in a manner that weights certain coefficients more heavily than others, allowing one to discard the less influential points. Examples of this coding method are the fast Fourier transform (FFT), discrete cosine, Walsh-Hadamard and the Radon transform.

Transform coding typically suffers from several problems. The computational time for computing the transforms rises exponentially with the number of pixels in the image. For large images this can lead to high costs and slow processing which can be prohibitive, particularly if real time reconstruction is desired. A further drawback is that most transforms work best over square or rectangular regions. If the image data is not presented in one of the prescribed geometries, it must be padded with zeros to make it conform, but zeros do not lower the computational complexity. Further, many conventional transform methods do not provide enough compression to be useful in certain memory intensive applications. In addition, some of these transform methods do not provide an accurate compressed image.

Compression of image data by encoding techniques is useful in various applications. For example, high definition television (HDTV) systems require a much higher bandwidth than the current American television system (which uses the NTSC standard). Proposed methods for implementing an HDTV system generally include some form of image compression to reduce the bandwidth requirements. Satellite systems are another area where image data compression is useful. Because of the expense of satellites and the limited number of satellites available for use, image data compression is important for its reduction in the burden on satellite systems. Image data compression is also useful in flight simulation systems to help reduce the typically large memory requirements. HDTV systems, satellites and flight simulators typically require fast data compression algorithms because the systems must operate near real time. Thus, even where current transform methods provide enough accuracy and compression, these methods generally do not operate quickly enough for use with conventional hardware.

Local operators such as run length encoding and quantization, unlike current transform methods, generally operate quickly enough for the above applications. However, local operators generally do not provide the required compression ratios.

The Poisson picture processing (PPP) algorithm was developed by Hughes Aircraft to alleviate the above problems. The PPP algorithm supplies fast data compression with good compression ratios and accurate reconstructions. See the final report on ACMP DATA COMPRESSION by the Hughes Aircraft, Support Systems by J. Drummond, J. McWaid, F. Lin, and K. Dubbs, December 1985 to October 1987. The Poisson method is a local operation that simulates run length encoding in two dimensions.

While the Poisson method provides a fast data compression algorithm, no iterative hardware decompression scheme is disclosed. Many applications, especially real time applications, require the speed that can only be achieved by an iterative hardware implementation. Thus, there is a need in the art for a fast method or technique for iterative hardware decoding of an image that has been encoded using the Poisson picture processing algorithm.

SUMMARY OF THE INVENTION

The need in the art is addressed by the fast image decoder of the present invention. The decoder produces a reconstructed image from compressed images encoded using the Poisson picture processing algorithm. The invention includes a run length decoder for run length decoding the compressed image, a processing circuit including a lookup table for iteratively processing each pixel output by the run length decoder, a frame memory for storing the reconstructed image and a feedback path for providing image data from the frame memory to the lookup table for successive processing iterations. The reconstructed image from the frame memory may be viewed on a display or further processed as required by the specific application.

DESCRIPTION OF THE INVENTION

Figures 1, 2:
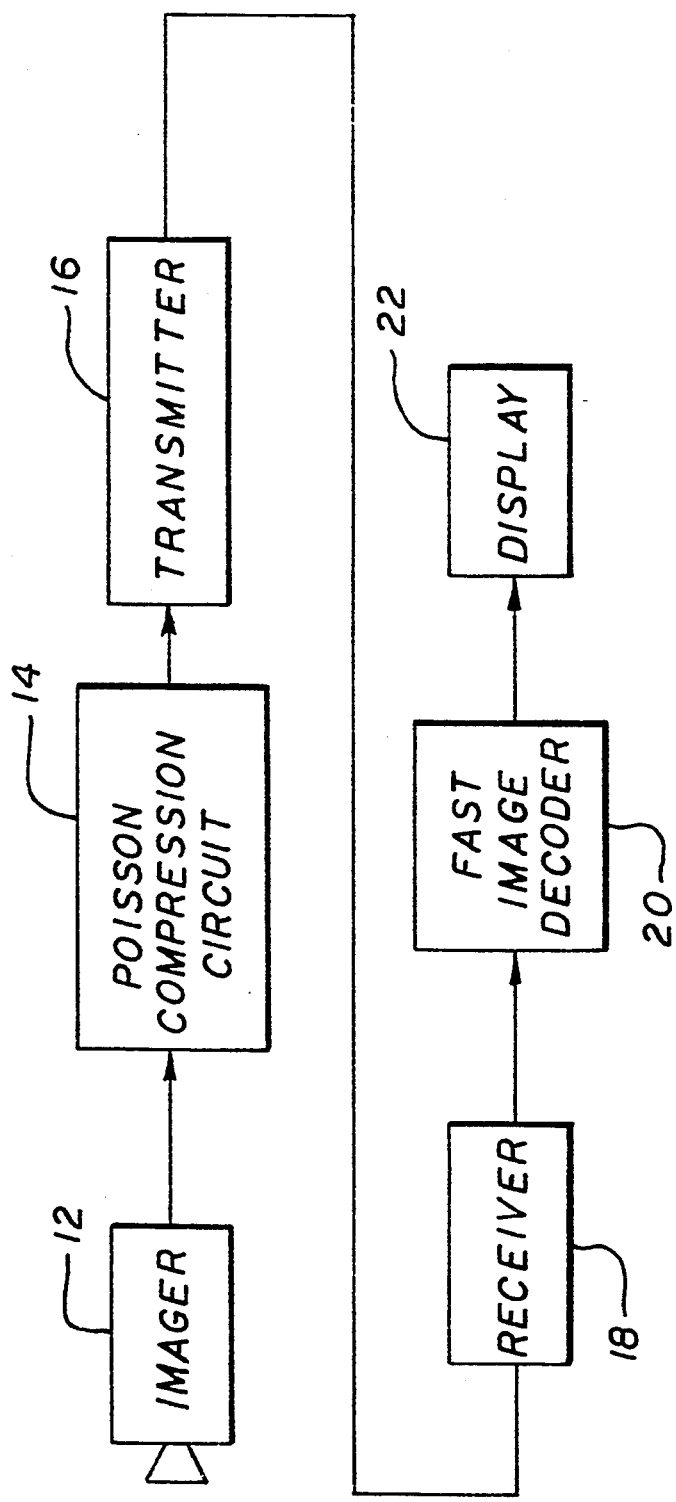
FIG. 1 shows a simplified block diagram of a video system utilizing the fast image decoder of the present invention.
FIG. 2 shows a sample image for use in illustrating the operation of the fast image decoder of the present invention.

FIG. 1 shows a simplified block diagram of a video system 10 which utilizes the fast image decoder 20 of the present invention. The video system 10 compresses an image received by an imager 12 and then decodes this compressed image using the fast image decoder 20 of the present invention for viewing on a display 22. The video system 10 includes an imager 12, a Poisson compression circuit 14, a transmitter 16, a receiver 18, the fast image decoder 20 of the present invention and a display 22. The video system 10 may be a part of a satellite system, a high definition television (HDTV) system, a flight simulator or any other system that may benefit from image compression.

The imager 12 views a scene and provides an image to the Poisson compression circuit 14. The imager 12 may be a camera such as a forward looking infrared (FLIR) camera or any other type of imager without departing from the scope of the present invention. The Poisson compression circuit utilizes the Poisson picture processing (PPP) algorithm which is known in the art as mentioned in the above referenced final report. The PPP algorithm is used to produce a compressed image which requires less memory for storage and less bandwidth for transmission than that required by the original image.

In the PPP algorithm, compression is accomplished by first performing local operations on the entire image and then run length encoding the result. The local operations are performed on windows in an array including a center pixel and the pixels on the top, bottom, right and left sides of the center pixel. The center pixel is multiplied by a multiplier value and the sum of the top, bottom, right and left pixels is subtracted from the result of the multiplication. If the absolute value of the result is less than a threshold value, then the center pixel is replaced with a zero. Otherwise, the center pixel is left alone. Thus, for the center pixel F of the sample image of FIG. 2, the equation is as follows (for a multiplier value of four):

$$\text{If } |4*F-(B+J+G+E)| < \text{threshold, replace pixel } F \text{ with a zero, else leave pixel } F \text{ alone.} \quad [1]$$

Where the absolute value of the result of the equation is greater than the threshold, the center pixel is different enough from the surrounding pixels that it is important to preserve the pixel value. For the special case where the center pixel does not have one or more pixels on the top, bottom right or left, then the center pixel is replicated to obtain the missing surrounding pixels. For example, for processing pixel A of FIG. 2 as the center pixel, the equation is as follows:

$$\text{If } |4*A-(A+E+B+A)| < \text{threshold, replace pixel } F \text{ with a zero, else leave pixel } F \text{ alone.} \quad [2]$$

Where the center pixel is already zero and the absolute value of the result is greater than the threshold, the pixel is replaced with a one. A one is chosen because one represents the smallest gray scale value. The one is necessary to preserve the center pixel value. In the preferred embodiment, four is chosen as the multiplier value. Those skilled in the art will recognize that other multiplier values may be chosen without departing from the scope of the present invention.

Once the local operation is performed on the entire image, the resulting sparse array of intensities for which the threshold is exceeded is run length encoded. Run length encoding typically produces an array with intensity values and associated numbers indicating the number of times the particular intensity value is repeated before a pixel with a different intensity value is encountered. Thus, each horizontal group of pixels with the same intensity value can be represented by two numbers. The result of the PPP algorithm is a compressed image provided in a short period of time. The value chosen for the threshold in the PPP algorithm affects the amount of compression achieved. Larger thresholds produce more zeros in the local operation, thus producing a more highly compressed image upon run length encoding. In the preferred embodiment, thirty-two is chosen as the threshold value. Those skilled in the art will recognize that other threshold values may be chosen without departing from the scope of the present invention.

The compressed image from the compression circuit 14 is provided to a transmitter 16 which transmits the compressed image to a receiver 18. Those skilled in the art will recognize that the transmitter 16 may be a satellite transmitter or other circuitry within a system which transmits the compressed image to a second part of the system. Further, the receiver 18 may be a satellite receiver or other circuitry within a system which receives the compressed image from a first part of the system. Those skilled in the art and with access to the present teachings will design video systems 10 with transmitters 16 and receivers 18 as required for particular applications.

The compressed image is provided to the fast image decoder 20 of the present invention. The fast image decoder 20 decodes the compressed image to provide a reconstructed image similar to that originally viewed by the imager 12. Those skilled in the art will recognize that the reconstructed image may be viewed on the display 22 or processed further as required for the particular application without departing from the scope of the present invention.

Figure 3:
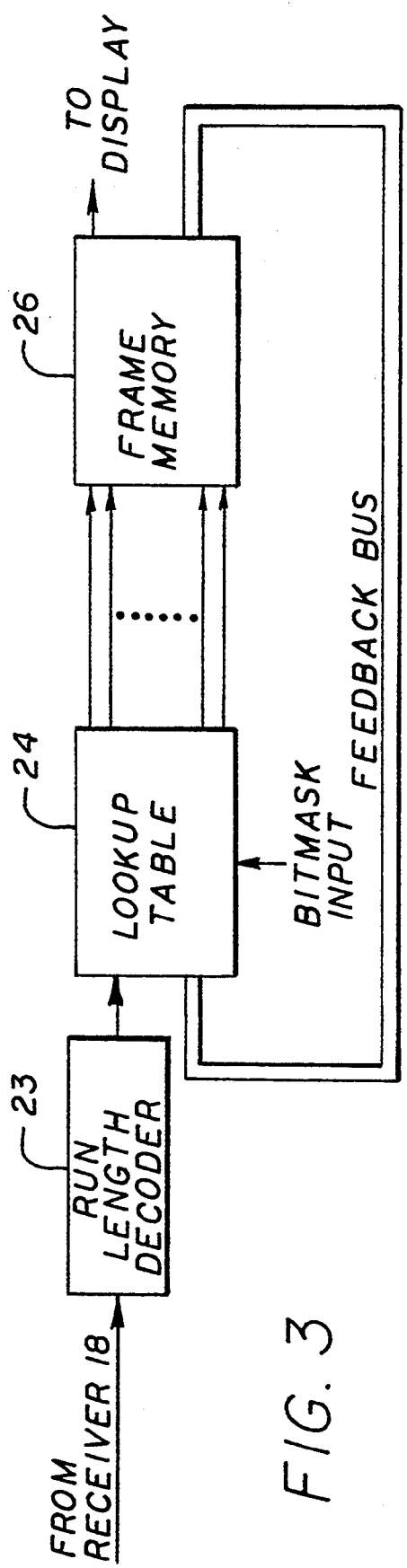
FIG. 3 shows an illustrative implementation of a preferred embodiment of the fast image decoder of the present invention.

FIG. 3 shows an illustrative implementation of a preferred embodiment of the fast image decoder 20 of the present invention. The image decoder 20 includes a run length decoder 23, a processing circuit implemented by an image processing lookup table 24, a frame memory 26 and a feedback bus 28. The fast image decoder 20 operates by first run length decoding the compressed image and then performing iterative operations to reconstruct the original image.

The compressed image from the receiver 18 is an input to the run length decoder 23 which run length decodes the compressed image to provide a sparse array of pixel values as an output. The run length decoder 23 may be implemented by a software procedure or by using a digital signal processing integrated circuit such as the Texas Instruments TMS 310 family. Those skilled in the art will recognize that other implementations for the run length decoder may be utilized without departing from the scope of the present invention.

Figure 4:
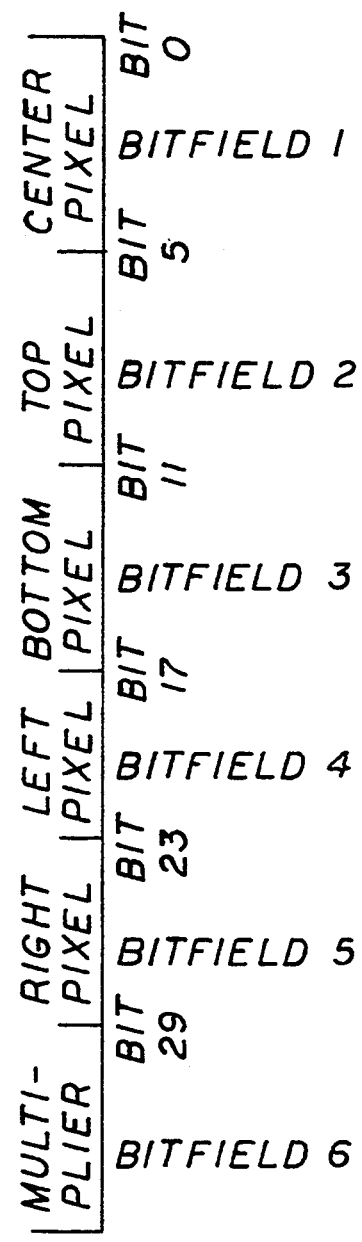
FIG. 4 shows a typical composition for the data words of the lookup table of the fast image decoder of the present invention.

The sparse array from the decoder 23 is loaded into the lookup table 24 with each word of the lookup table 24 representing the multiplier value and the right, left, bottom, top and center pixel values. FIG. 4 shows a typical composition for the lookup table 24 where the word length of the lookup table 24 is thirty-two bits. It will be appreciated by those skilled in the art that the type of lookup table 24 may vary without departing from the scope of the present invention. For example, the lookup table 24 may be custom designed or purchased. Imaging Technologies manufactures the F×100 image processing board which has a lookup table with 256 inputs where each input is a thirty-two bit word. The Pixar image processing system also has 256 inputs, but each input is a forty-eight bit word. Those skilled in the art will recognize that each pixel of the sparse array may be quantized as appropriate for the word length of the lookup table 24 before being loaded.

After the lookup table 24 is loaded, all words of the lookup table 24 for which the center pixel value is non-zero are masked to prevent alteration by processing. A microprocessor or other circuitry may be utilized to load the lookup table 24 and to determine which pixel values are non-zero and to mask these pixels through the mask input of the lookup table 24. Furthermore, those skilled in the art will appreciate that the lookup table 24 may be designed to automatically load and mask the appropriate words.

After the lookup table 24 is loaded and the appropriate words are masked, the lookup table 24 is ready to process the data. For the masked words, the center pixel is unchanged, thus, the output is the center pixel value itself (bitfield 1). For the non-masked words, the output is as follows:

$$(((\text{bitfield } 2 + \text{bitfield } 3 + \text{bitfield } 4 + \text{bitfield } 5) \div \text{bitfield } 6) - \text{bitfield } 1) * \text{an overrelaxation constant}. \qquad [3]$$

The overrelaxation constant is designed to bring the processed data close to the desired output in fewer iterations. If the overrelaxation constant is set equal to one, it takes more iterations to fill in the non-masked words with the optimal final output image. In the preferred embodiment, the overrelaxation constant is 1.5. Those skilled in the art will recognize that other values for the overrelaxation constant may be utilized without departing from the scope of the present invention. The output of each word of the lookup table 24 is an input to the frame memory 26 and represents the new center pixel values. The frame memory 26 stores the center pixel values to form the reconstructed image.

After the entire compressed image has been through one processing iteration, the microprocessor or other circuitry utilized to control the PPP algorithm loads the lookup table 24 from the frame memory 26 through the feedback bus 28 rather than from the run length decoder 23 for the next iteration of processing. During subsequent iterations, only those words in the lookup table 24 that were masked on the first processing iteration because the words contained a non-zero center pixel value are again masked from processing. Thus, after several iterations, the reconstructed image will approach the sharpness of the original image. In the preferred embodiment, six iterations is generally sufficient processing to obtain a reconstructed image with the appropriate sharpness. Those skilled in the art and with access to the present teachings will perform the appropriate number of iterations required to obtain the desired sharpness for the reconstructed image.

The output of the frame memory 26 may be sent to a display for viewing by an operator. The reconstructed image viewed on this display may be used to determine the number of processing iterations required. Alternatively, displaying the image may be delayed until several iterations are performed. Those skilled in the art will recognize that the output of the frame memory 26 may also be sent to other image processing circuitry for further processing without departing from the scope of the present invention.

Thus, the present invention has been described herein with reference to a particular embodiment for a particular application. Those of ordinary skill in the art with access to the teachings of the present invention will recognize additional modifications, applications and embodiments within the scope of the invention.

It is therefore intended by the appended claims to cover any and all such modifications, applications and embodiments within the scope of the present invention.

Accordingly,

What is claimed is:

1. A fast image decoder for producing a reconstructed image from compressed images encoded using the Poisson picture processing algorithm, said fast image decoder comprising:

run length decoder means for run length decoding said compressed image to form a sparse array of pixel values;

processing means coupled to said run length decoder means for receiving said sparse array of pixels and for iteratively processing pixels to produce said reconstructed image; and frame memory means coupled to said processing means for receiving said reconstructed image and for successively storing said reconstructed image and feeding back pixels for said reconstructed image to said processing means for successive processing iterations, said processing means for iteratively receiving and processing pixels for said successive reconstructed images to increase the quality of said reconstructed image.

2. The invention of claim 1 wherein said run length decoder means is a special purpose integrated circuit for performing run length decoding.

3. The invention of claim 1 wherein said run length decoder means is a run length decoder implemented in software.

4. The invention of claim 1 wherein said processing means includes lookup table means for outputting a first value that is the value of the pixel of said sparse array when the value of said pixel is non-zero and outputting a second value that is the result of the sum of the pixels on the top, bottom, left and right sides of the pixel being processed divided by a multiplier value and then subtracting the value of the pixel being processed when the value of said pixel is zero in the sparse array.

5. The invention of claim 4 wherein said lookup table means is an image processing lookup table circuit.

6. The invention of claim 4 wherein said processing means further includes means for multiplying said second value by an overrelaxation constant to reduce said number of iterations necessary to produce a final version of said reconstructed image.

7. The invention of claim 4 wherein said lookup table means includes bit mask means for masking from processing said pixels of said sparse array with non-zero values.

8. The invention of claim 4 wherein said multiplier value corresponds to the multiplier value used in encoding said compressed image using said Poisson picture processing algorithm.

9. A video system comprising:

digitizing means for digitizing an image;

Poisson encoding means for encoding said image to produce a compressed image;

transmitter means for transmitting said compressed image in said video system;

fast image decoder means for producing a reconstructed image including (a) run length decoder means for run length decoding said compressed image to form a sparse array of pixel values, (b) processing means coupled to said run length decoder means for receiving said sparse array of pixels and for iteratively processing pixels to produce said reconstructed image, and (c) frame memory means coupled to said processing means for receiving said reconstructed image and for successively storing said reconstructed image and feeding back pixels for said reconstructed image to said processing means for successive processing iterations, said processing means for iteratively receiving and processing pixels for said successive reconstructed images to increase the quality of said reconstructed image; and display means for displaying said reconstructed image.

10. The invention of claim 9 including:

run length decoder means for run length decoding said compressed image to form a sparse array of image values;

processing means for iteratively processing each pixel of said sparse array to produce said reconstructed image; and frame memory means for storing said reconstructed image and providing a feedback path to said processing means for successive processing iterations.

11. A method for decoding a compressed image encoded using the Poisson picture processing algorithm including the steps of:

a) run length decoding said compressed image to form a sparse array;

b) loading a lookup table with the value of a pixel from said sparse array, the values of the pixels on the top, bottom, right and left sides of said pixel and with a multiplier value;

c) masking said pixel from processing if the value of said pixel is non-zero;

d) outputting the value of said pixel if said pixel is non-zero pixel or;

e) if the value of said pixel is zero, outputting the result of the sum of the values of the pixels on the top, bottom, left and right sides of said pixel divided by said multiplier and then subtracting said pixel value;

f) after step e) above, storing said result in a frame memory; and g) after step f) above, feeding said result back to said lookup table for successive processing iterations until the desired quality of image is increased.

12. A fast image decoder for producing a reconstructed image from an image compressed using the Poisson picture algorithm comprising:

processing means for iteratively processing said compressed image, and a lookup table means for outputting a first pixel value that is the value of the pixel of a sparse array of pixel values when the value of said pixel is non-zero and outputting a second pixel value that is the result of the sum of the pixels on the top, bottom, left and right sides of the pixel being processed divided by a multiplier value and then subtracting the value of the pixel being processed when the value of said pixel is zero in the sparse array, whereby said second pixel values are iteratively processed and fed back to said processing means for further processing to increase the quality of the reconstructed image.

13. The invention of claim 12 wherein said processing means further includes means for multiplying said second value by an overrelaxation constant to reduce said number of iterations necessary to produce a desired reconstructed image.

14. The invention of claim 12 wherein said lookup table means includes means for masking from processing pixels with non-zero values.

15. A fast iterative image decoder for producing a final reconstructed image from a compressed image, which compressed image has been compressed using the Poisson picture processing algorithm, said fast iterative image decoder comprising:

run-length decoder means for receiving said compressed image and run-length decoding said compressed image to provide a sparse array of pixel values;

processing means for receiving said sparse array of pixel values and for iteratively processing pixels of said sparse array to provide at least a first intermediate reconstructed image and said final reconstructed image;

frame memory means for successively storing said first intermediate reconstructed image and said final reconstructed image, as well as any successive intermediate images which lead from said first intermediate reconstructed image to said final reconstructed image by successive iterations of said processing means, said frame memory means feeding back pixel values from said sparse array to said processing means for successive iterative processing; and means for selecting the number of iterations to be performed by said processing means leading successively from said first intermediate reconstructed image to said final reconstructed image.

16. The fast iterative image decoder of claim 15 wherein said processing means further includes look-up table means for iteratively outputting as a value for a pixel of said sparse array either a first value or a second value dependent upon whether said pixel has a non-zero value or a zero value, respectively.

17. The fast iterative image decoder of claim 16 wherein said look-up table means outputs the non-zero value of said pixel as said first value for said pixel.

18. The fast iterative image decoder of claim 16 wherein said look-up table means outputs said second value for said pixel when said pixel has a zero value, said second value being equal to the quotient of the sum of the pixel values above, below, left and right of said pixel in said sparse array, which sum is divided by a selected value.

19. The fast iterative image decoder of claim 18 wherein said selected value corresponds to a multiplier value used in said Poisson picture processing algorithm.

20. The fast iterative image decoder of claim 18 wherein said processing means further includes means for multiplying said second value by an over-relaxation constant to provide a third value which is output as the value for said pixel to reduce the number of iterations necessary to provide said final reconstructed image.

21. The fast iterative image decoder of claim 20 wherein said over-relaxation constant is selected to be greater than one (1).

22. The fast iterative image decoder of claim 21 wherein said over-relaxation constant is selected to be substantially 1.5.

23. The fast iterative image decoder of claim 15 wherein said iteration number selecting means selects six (6) as the number of iterations performed from said first intermediate reconstructed image to said final reconstructed image.

24. A fast iterative image decoding method for decoding a compressed image produced by the Poisson picture processing algorithm to provide a series of intermediate reconstructed images leading by successive iterations of said process to a final reconstructed image, said method comprising the steps of:

run-length decoding said compressed image to provide a sparse array of pixel values;

iteratively loading a look-up table with pixel values from said sparse array, and successively outputting from said look-up table a next-successive value for a corresponding particular one of said pixels; said next-successive value being equal to the value of said particular pixel when said value is non-zero, said next-successive value for said particular pixel being equal to the quotient of the sum of pixel values immediately above, below, left and right of said particular pixel in said sparse array, which sum is divided by a selected value to provide said quotient;

masking pixels having non-zero values from processing; and processing zero-valued pixels of said sparse array to successively provide a first intermediate reconstructed image, each of said succession of intermediate reconstructed images, and said final reconstructed image.

25. The fast iterative image decoder method of claim 24 further including the step of multiplying said next-successive value for a zero-valued pixel by an over-relaxation constant.

26. The fast iterative image decoder method of claim 25 further including the step of selecting said over-relaxation constant to be greater than one (1).

27. The fast iterative image decoder method of claim 26 further including the step of selecting said over-relaxation constant to be substantially equal to 1.5.

28. The fast iterative image decoder method of claim 24 further including the step of using as said selected value a value substantially equal to a multiplier value which is used in said Poisson picture processing algorithm.

* * * * *